March 20, 1945.  E. E. MASTERSON  2,371,836
MOTION PICTURE APPARATUS
Filed Oct. 18, 1943
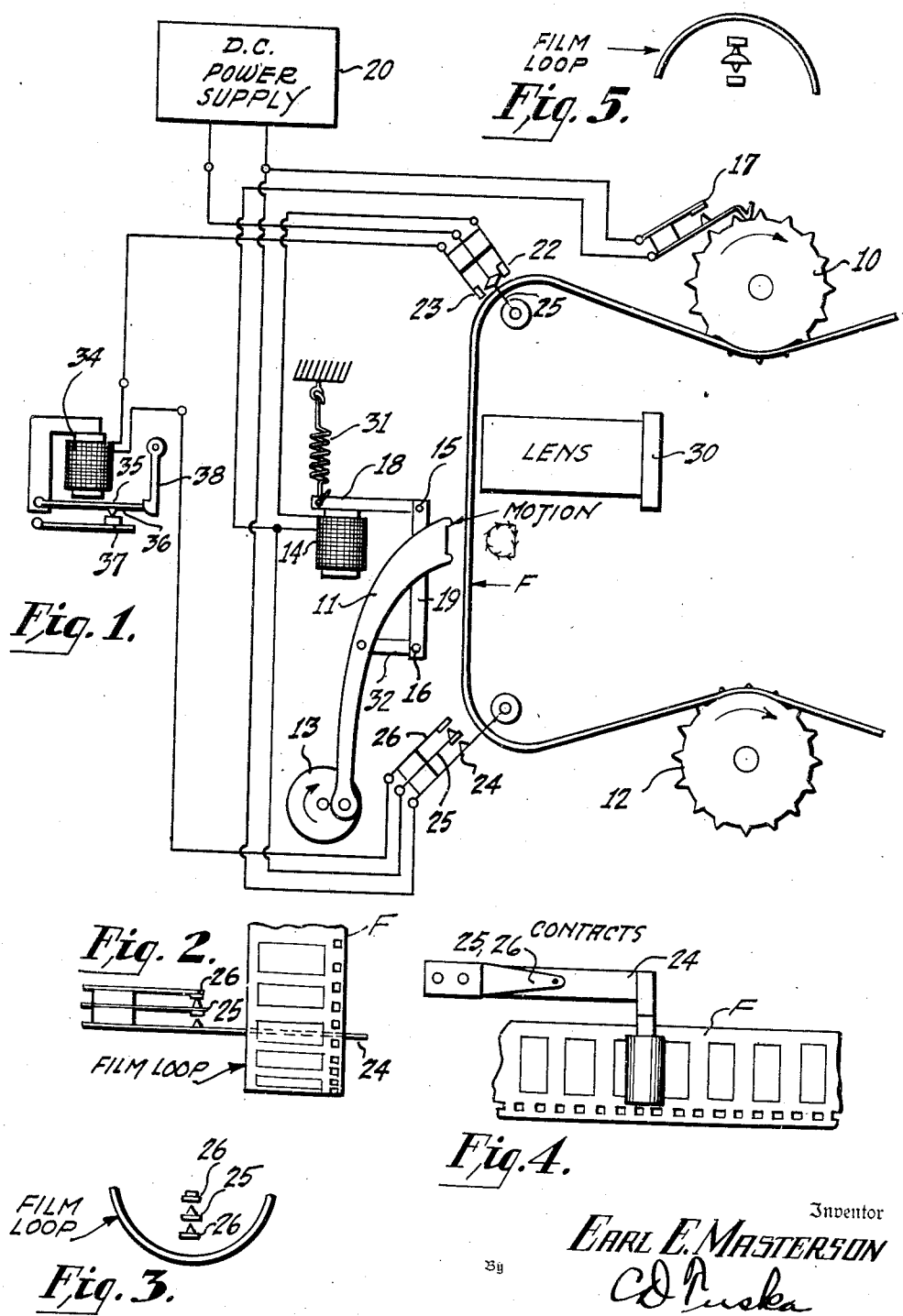
Inventor
EARL E. MASTERSON
By CD Puska
Attorney Patented Mar. 20, 1945

2,371,836

UNITED STATES PATENT OFFICE 2,371,836

MOTION-PICTURE APPARATUS

Earl Edgar Masterson, Indianapolis, Ind., assignor to Radio Corporation of America, a corporation of Delaware Application October 18, 1943, Serial No. 506,693

17 Claims. (Cl. 88—18.4)

This invention relates to motion picture apparatus of the intermittent grip type in which the engagement of the claw with the film is controlled electrically. This apparatus also includes an automatic loop resetter.

The apparatus involves the usual upper and lower sprockets and a mechanically operated film claw driven at two or three times the frame speed. The claw is moved into engagement with the film by an electro-magnet, the operation of which is controlled by a switch actuated from an appropriate cam or from the sprocket teeth. If the upper film loop is lost the magnet stops operation until the upper loop has been built up by film fed through the upper sprocket. If the lower loop is lost the magnet is actuated for each revolution of the cam until the lower loop is built up. If both loops are lost the power line is opened in order to stop the driving motor.

One object of the invention is to provide a motion picture claw feed in which the engagement of the claw with the film is controlled by a magnet.

Another object of the invention is to provide an automatic loop resetting means.

Another object of the invention is to provide means for stopping the drive motor if both loops of film are lost.

Another object of the invention is to provide means for feeding the film through the picture gate at an increased rate of speed if the lower film loop is lost.

Another object of the invention is to provide means for momentarily stopping the feed of film through the picture gate while continuing to feed the film through the sprockets when the upper film loop is lost.

Other and incidental objects of the invention will be apparent to those skilled in the art by a reading of the following specification and an inspection of the accompanying drawing in which:

Figure 1 is a schematic side view of my improved motion picture machine

Figure 2 is a view of the switch 24, 25, 26 of Fig. 1 shown from the rear of the film Figure 3 is a schematic view of the arrangement of the contacts 24, 25, 26 in relation to the lower film loop and Figure 4 is a top view of the switch in the lower loop of Fig. 1

Figure 5 is a schematic view of the arrangement of the contacts 21, 22, 23 in relation to the upper film loop.

Referring first to Fig. 1, a film F is fed into and out of the machine by the sprockets 10 and 12. These sprockets are geared together in the usual manner. The film is fed past the projection aperture indicated by the lens 30 by the claw 11 which is moved up and down by the cam 13. This cam or crank is driven at a speed of two or three, or possibly even four times, the frame speed. In 16 millimeter motion picture film the frame speed corresponds with the number of teeth on the sprockets 10 and 12. The claw 11 is engaged with the film by the operation of the magnet 14. The magnet 14 attracts the armature 18 against the tension of the spring 31, thereby moving the armature 18 and the arm 19 about the fixed pivot 15. The movable pivot 16 pulls the link 32 and with it the arm 11 toward the film, thereby causing the engagement of the teeth on the arm with the sprocket holes in the film. The magnet 14 is actuated by an appropriate power supply 20 and the periods of its operation are determined by the switch 17. The switch 17 may be engaged by the teeth of the sprocket 10, or an appropriate cam causing the closing of the switch 17 may be provided so that the switch is closed for each passage of a tooth on the sprocket 10.

The film is provided with the usual loops between each of the sprockets and the intermittent feed. Occasionally the lower film loop will be lost in practically any intermittent grip type projector due to either the failure of the teeth on the claw to engage the film or to a defective sprocket hole in the film. In the present apparatus if the lower loop is lost the film raises the arm 24 shown in more detail in Figs. 2, 3 and 4, causing it to engage the contact arm 25 closing the circuit from the power supply to the magnet 14 independently of the operation of the switch 17. The claw 11 therefore engages the film at each revolution of the cam 13 until the lower loop is restored. It will be apparent that the rate of film feed at the film gate under this circumstance is two or three times that at the sprockets.

Occasionally the upper film loop will be lost. In that case the circuit from the power supply 20 to the switch 17 and to the magnet 14 will be interrupted by opening the switch 21, 22 which is normally closed. This prevents the claw 11 from engaging the film until the upper loop has been built up by the film fed from the sprocket 10. The switch 21, 22, 23 is of similar construction to the switch 24, 25, 26.

When the circuit at 21, 22 is opened by the depression of the film engaging arm a circuit will be closed from one side of the power supply through the contacts 21 and 23 leading to the magnet 34. If at the same time the lower film loop is lost the circuit will be completed through the contacts 24, 25 and 26 to the other side of the power supply. This will cause the magnet 34 to raise its armature 35 opening the contacts 36, 37 which are connected in the circuit of the motor which drives the motion picture projector. The armature 35 is latched in the open position by an appropriate catch 38.

It will be understood that the projector is capable of satisfactory operation with three or four frames less than the normal length of film in the loops between the sprockets and the intermittent feeding mechanism, so that the film may slip a few frames at sprocket 10 or be pulled faster past sprocket 12 without causing any adjustment action, such as the slowing down or speeding up of the intermittent advancing mechanism. However, should enough film slip past sprocket 10 to cause the opening of switch 21—22, then the intermittent feeding mechanism will slow down to permit sprocket 10 to restore the upper loop. This action will shorten the lower loop, but since it has a few frames more than normal, switch 24—25 will not be closed if the slippage at sprocket 10 is not greater than this. If the slippage at sprocket 10 is too great, however, then the switch 24—25 will be closed, and with the switch 21—22 still open, the driving mechanism will be stopped.

If the lower loop is lost due to torn sprocket holes, switch 24—25 will close, speeding up the advancing action of claw 11. If this action by itself does not restore the lower loop, then sprocket 12 will pull the film past the gate until the claw reaches a good sprocket hole, whereupon its rapid advancing action will restore the lower loop. The excess film in the upper loop will provide the film necessary for the lower loop unless it has been necessary for the sprocket 12 to take more than that, whereupon the switch 21—22 will be opened and the driving mechanism will be stopped.

It will be apparent that many changes in details may be made in my device. For example, instead of using direct current to actuate the magnets 14 and 13, alternating current can be used with appropriate solenoides. It is preferred to use direct current, however, on account of the intermittent contact at the switch 17, which contact might occur when there is no current flowing if an A. C. supply was used. The switches shown are merely diagrammatic, and any usual type of switch which is adapted to perform the functions required may be used.

I claim as my invention:

1. In a motion picture machine of the intermittent grip type a feed claw adapted to engage and feed the film, means for driving the feed claw in a direction longitudinally of the film at a multiple of the picture speed, magnetic means for causing the feed claw to engage the film, means causing the actuation of the magnetic means once for each frame for the picture, and means for interrupting the operation of the magnetic means when the upper film loop is lost.

2. In a motion picture machine of the intermittent grip type a feed claw adapted to engage and feed the film, means for driving the feed claw in a direction longitudinally of the film at a multiple of the picture speed, magnetic means for causing the feed claw to engage the film, means causing the actuation of the magnetic means once for each frame for the picture, and means for causing the magnetic means to be engaged when the lower film loop is lost.

3. In a motion picture machine of the intermittent grip type a feed claw adapted to engage and feed the film, means for driving the feed claw in a direction longitudinally of the film at a multiple of the picture speed, magnetic means for causing the feed claw to engage the film, means causing the actuation of the magnetic means once for each frame for the picture, means for interrupting the operation of the magnetic means when the upper film loop is lost, and means for causing the magnetic means to be engaged when the lower film loop is lost.

4. In a motion picture machine of the intermittent grip type a feed claw adapted to engage and feed the film, means for driving the feed claw in a direction longitudinally of the film at a multiple of the picture speed, magnetic means for causing the feed claw to engage the film, means causing the actuation of the magnetic means once for each frame for the picture, means for interrupting the operation of the magnetic means when the upper film loop is lost, means for causing the magnetic means to be engaged when the lower film loop is lost, and means for interrupting the power supply to the machine when both film loops are lost.

5. In a motion picture machine of the intermittent grip type sprockets for feeding film to and from the machine, a feed claw adapted to engage and feed the film between the sprockets, means for driving the feed claw in a direction longitudinally of the film at a multiple of the picture speed, magnetic means for causing the feed claw to engage the film, and means controlling the magnetic means in relation to the feed of the film to the feed claw.

6. In a motion picture machine of the intermittent grip type sprockets for feeding film to and from the machine, a feed claw adapted to engage and feed the film between the sprockets, means for driving the feed claw in a direction longitudinally of the film at a multiple of the picture speed, magnetic means for causing the feed claw to engage the film, means causing the actuation of the magnetic means once for each frame for the picture, and means for interrupting the operation of the magnetic means when the upper film loop is lost.

7. In a motion picture machine of the intermittent grip type sprockets for feeding film to and from the machine, a feed claw adapted to engage and feed the film between the sprockets, means for driving the feed claw in a direction longitudinally of the film at a multiple of the picture speed, magnetic means for causing the feed claw to engage the film, means causing the actuation of the magnetic means once for each frame for the picture, and means for causing the magnetic means to be engaged when the lower film loop is lost.

8. In a motion picture machine of the intermittent grip type sprockets for feeding film to and from the machine, a feed claw adapted to engage and feed the film between the sprockets, means for driving the feed claw in a direction longitudinally of the film at a multiple of the picture speed, magnetic means for causing the feed claw to engage the film, means causing the actuation of the magnetic means once for each frame for the picture, means for interrupting the operation of the magnetic means when the upper film loop is lost, and means for causing the magnetic means to be engaged when the lower film loop is lost.

9. In a motion picture machine of the intermittent grip type sprockets for feeding film to and from the machine, a feed claw adapted to engage and feed the film between the sprockets, means for driving the feed claw in a direction longitudinally of the film at a multiple of the picture speed, magnetic means for causing the feed claw to engage the film, means causing the actuation of the magnetic means once for each frame for the picture, means for interrupting the operation of the magnetic means when the upper film loop is lost, means for causing the magnetic means to be engaged when the lower film loop is lost, and means for interrupting the power supply to the machine when both film loops are lost.

10. In a motion picture machine, the combination of an intermittent film feeding mechanism adapted to engage and advance the film at a certain normal rate, sprocket means adapted to feed said film to and from said intermittent mechanism at said same normal rate, and means positioned ahead of said intermittent film advancing mechanism for controlling the rate of film advancing action of said intermittent mechanism, said means decreasing the rate of film advancing action of said intermittent mechanism during periods when the rate of film fed to said intermittent mechanism is less than said normal rate.

11. In a motion picture machine, the combination of an intermittent film feeding mechanism adapted to engage and advance the film at a certain normal rate, sprocket means adapted to feed said film to and from said intermittent mechanism at said same normal rate, and means positioned behind said intermittent film advancing mechanism for controlling the rate of film advancing action of said intermittent mechanism, said means increasing the rate of film advancement action of said intermittent mechanism when the rate of film fed away from said intermittent mechanism is less than the rate of the film passing therethrough.

12. In a motion picture machine, the combination of an intermittent film feeding mechanism adapted to engage and advance said film at a certain normal rate, sprocket means adapted to feed said film to and from said intermittent mechanism at said same normal rate, and a plurality of means positioned ahead and behind said intermittent mechanism for controlling the rate of advancing action of said intermittent film feeding mechanism, said means decreasing the rate of advancing action of said film feeding mechanism when the film fed thereto is less than said normal rate and for increasing the rate of advancing action of said mechanism when the film taken therefrom is greater than said normal rate.

13. In a motion picture machine, a combination of an intermittent film advancing mechanism adapted to engage and advance said film at a certain normal rate, a sprocket adapted to feed said film at said same normal rate to said intermittent film advancing mechanism, a second sprocket adapted to take film from said intermittent feed mechanism at the same normal rate as said film is advanced through said intermittent film mechanism, and means positioned intermediate said intermittent film feeding mechanism and said first mentioned sprocket for reducing the film feeding action of said intermittent film mechanism when said first mentioned sprocket feeds film at less than normal rate.

14. A motion picture machine in accordance with claim 13 in which additional means are provided intermediate said film advancing mechanism and said second mentioned sprocket for increasing said film advancing action when film passes said second mentioned sprocket at a rate above said normal rate.

15. A motion picture machine in accordance with claim 13 in which additional means are positioned intermediate said intermittent film advancing mechanism and said second mentioned sprocket for increasing the film advancing action of said intermittent mechanism during periods when said film is advanced at less than said normal rate therethrough.

16. In a motion picture machine, the combination of an intermittent film advancing mechanism adapted to engage and advance said film at a certain normal rate, a sprocket for feeding the film at said same normal rate to said intermittent advancing mechanism to provide a film loop of a predetermined size therebetween, a second sprocket adapted to take film from said intermittent advancing mechanism at said same normal rate to provide a predetermined sized film loop therebetween, electric means positioned in said first mentioned loop for causing said intermittent advancing mechanism to operate at a slower rate than normal during periods when said first mentioned loop is reduced in size by a predetermined amount, and electric means positioned in said second mentioned loop for causing said intermittent advancing mechanism to operate at a faster rate during periods when said second mentioned loop is reduced in size by a predetermined amount.

17. A motion picture machine in accordance with claim 16 in which the simultaneous operation of both of said electric means stops the film advancing action of said sprockets and said intermittent mechanism.

EARL EDGAR MASTERSON.